US012649191B2

(12) United States Patent　　　(10) Patent No.:　US 12,649,191 B2
Makino et al.　　　　　　　　　　(45) Date of Patent:　　　Jun. 9, 2026

(54) DRILL

(71) Applicant: OSG CORPORATION, Toyokawa (JP)

(72) Inventors: Hiroyasu Makino, Toyokawa (JP);
Yukimasa Takagishi, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 377 days.

(21) Appl. No.: 18/553,927

(22) PCT Filed: May 10, 2021

(86) PCT No.: PCT/JP2021/017615
§ 371 (c)(1),
(2) Date: Oct. 4, 2023

(87) PCT Pub. No.: WO2022/239045
PCT Pub. Date: Nov. 17, 2022

(65) Prior Publication Data
US 2024/0181542 A1　　Jun. 6, 2024

(51) Int. Cl.
B23B 51/06　　　(2006.01)
B23B 51/02　　　(2006.01)

(52) U.S. Cl.
CPC ............ B23B 51/068 (2022.01); B23B 51/02 (2013.01)

(58) Field of Classification Search
CPC ....... B23B 51/06; B23B 51/068; B23B 51/02; B23B 2222/04; B23B 2226/31; B23B 2251/047; B23B 2251/182
See application file for complete search history.

(56) References Cited

U.S. PATENT DOCUMENTS

2015/0037105 A1*　2/2015　Fukata .................... B23C 5/28
　　　　　　　　　　　　　　　　　407/11
2015/0266113 A1*　9/2015　Fukata .................... B23C 5/28
　　　　　　　　　　　　　　　　　407/11
(Continued)

FOREIGN PATENT DOCUMENTS

CN　　　111093871 A　　5/2020
EP　　　　4023378 A1　　7/2022
(Continued)

OTHER PUBLICATIONS

English translation of International Search Report of International Application No. PCT/JP2021/017615 mailed Jul. 6, 2021.
(Continued)

*Primary Examiner* — Moshe Wilensky
(74) *Attorney, Agent, or Firm* — Muncy, Geissler, Olds & Lowe, P.C.

(57)　　　　　　　ABSTRACT

A drill (1) is provided with a thinning edge (7), a gash portion (8), a coolant passage, and an oil hole (12). The thinning edge (7) is provided at a leading end portion of a body (3), and extends toward a chisel portion (9) from an inner end (51) of a cutting edge (5). A ridge line between the gash portion (8) and the flank (6) extends in a circular arc shape from an inner end of the thinning edge (7) toward an outer peripheral surface (31) of the body (3). The coolant passage is provided inside a shank and the body (3), and extends from a rear end portion of the shank toward the leading end portion of the body (3). The oil hole (12) is provided at a gash face (81) of the gash portion (8) and is an outlet of the coolant passage.

6 Claims, 8 Drawing Sheets

(56)     References Cited

U.S. PATENT DOCUMENTS

| | | |
|---|---|---|
| 2015/0360301 A1 | 12/2015 | Kauper |
| 2020/0282472 A1 | 9/2020 | Yamamoto |
| 2021/0229190 A1 | 7/2021 | Yamamoto |

FOREIGN PATENT DOCUMENTS

| | | |
|---|---|---|
| JP | S57-71714 A | 5/1982 |
| JP | H08-318419 A | 12/1996 |
| JP | 2010-214545 A | 9/2010 |
| JP | 2013-193159 A | 9/2013 |
| JP | 2019-048347 A | 3/2019 |
| WO | 2018/162185 A1 | 9/2018 |
| WO | 2019/049257 A1 | 3/2019 |
| WO | 2019/244796 A1 | 12/2019 |
| WO | 2021/038841 A1 | 3/2021 |

OTHER PUBLICATIONS

International Preliminary Report on Patentability of International Application No. PCT/JP2021/017615 drafted on Dec. 28, 2021 and English translation thereof.
The technical Parts of the Office Action of the corresponding DE application No. 112021007638.8 dated Sep. 24, 2024 and English translation thereof.
The first office action of the corresponding CN application No. 202180089690.0 mailed Feb. 13, 2026 and English translation thereof.

* cited by examiner

FIG. 6

| | | CLEARANCE ANGLE α OF FOURTH FLANK | | | | | | |
| | | 30° | 40° | 50° | 60° | 65° | 70° | 80° |
|---|---|---|---|---|---|---|---|---|
| POSITION OF VERTEX OF GASH PORTION (DISTANCE R) | −0.005D | × | × | △ | △ | △ | △ | × |
| | 0 | × | △ | ○ | ○ | ○ | △ | × |
| | 0.005D | × | △ | ○ | ○ | ○ | ○ | × |
| | 0.01D | × | ○ | ○ | ○ | ○ | ○ | × |
| | 0.02D | × | ○ | ○ | ○ | ○ | △ | × |
| | 0.03D | × | ○ | ○ | ○ | ○ | △ | × |
| | 0.04D | × | ○ | ○ | ○ | ○ | × | × |
| | 0.05D | × | △ | △ | △ | △ | × | × |

DRILL

TECHNICAL FIELD

The present invention relates to a drill.

BACKGROUND ART

Patent Literature 1 discloses a drill in which a thinning edge and a gash are formed at a leading end portion of a drill main body. The thinning edge is formed on the inner end side of a cutting edge, by applying a thinning process to the leading end portion of the drill main body. A ridge line between the gash and a flank extends in a circular arc shape from the inner end side of the thinning edge toward an outer peripheral surface of the drill.

CITATION LIST

Patent Literature

Patent Literature 1: WO-A1-2019/49257

SUMMARY OF INVENTION

In machining to form holes in a soft material, such as an aluminum alloy, discharge efficiency of chips deteriorates. By making a gash larger, the discharge efficiency of the chips is improved, but a web thickness of a flank becomes thin, and if the gash interferes with an oil hole of the flank, chipping easily occurs. By making the gash larger, a sharp point is generated at a heel portion and the chipping occurs more easily.

An object of the present invention is to provide a drill that can improve a chip discharge performance even with a soft work material.

Problems that Invention is to Solve

A drill including a drill main body to be rotated around a shaft center, and a discharge flute provided in a helical shape along an outer peripheral surface of the drill main body from a leading end portion toward a rear end portion thereof, a cutting edge being provided that is formed at a ridge section between an inner face, of the discharge flute, oriented toward a rotation direction side of the drill main body and a flank of the drill main body at the leading end portion. The drill includes: a thinning edge provided at the leading end portion of the drill main body and extending from an inner end of the cutting edge toward a central portion side of the leading end portion of the drill main body: a gash portion, a ridge line between the gash portion and the flank extending in a circular arc shape from an inner end of the thinning edge toward the outer peripheral surface of the drill main body: a coolant passage provided inside the drill main body and extending from the rear end portion toward the leading end portion of the drill main body: and an oil hole provided at a gash face of the gash portion, the oil hole being an outlet of the coolant passage. Since the oil hole is provided at the gash face, even if the web thickness of the flank becomes thinner as a result of making the gash portion larger, it is possible to secure the shape of the drill without chipping occurring in the oil hole. Since it is possible to make the gash portion larger, the drill can improve a chip discharge performance even with a soft work material, such as an aluminum alloy.

When a drill diameter of the drill according to the present aspect is D, at the leading end portion of the drill main body, a vertex bulging in a circular arc shape to the side of the cutting edge of the gash portion may be disposed within a range of 0.04 D to 0, to the cutting edge side with respect to a virtual straight line joining a center of the leading end portion and an outer end of the cutting edge. Since the position of the vertex of the gash portion is prescribed within the above-described range, the drill can improve the chip discharge performance.

The gash portion according to the present aspect may extend in the circular arc shape from the inner end of the thinning edge and may be connected to the outer peripheral surface of the drill main body. By connecting the outer end of the gash portion to the outer peripheral edge of the drill main body, the drill can make the gash portion even larger.

The flank according to the present aspect may be provided with a plurality of flanks aligned in an opposite direction to the rotation direction, a clearance angle of the flanks becoming larger in order of the flanks, and, of the plurality of flanks, the clearance angle of a rear-side flank positioned furthest to the rear in the rotation direction may be within a range of 50° to 65°. As a result of the clearance angle of the rear-side flank being prescribed within the above-described range, even when the gash portion is made larger, the gash portion can be gently connected to the outer peripheral edge of the drill main body without generating a sharp point at an outer end portion of the gash portion. Note that it is sufficient that there be the plurality of flanks, and when, for example, the flank positioned furthest to the front in the rotation direction of the drill main body is a second flank, a third flank and a fourth flank may be provided in order in the opposite direction to the rotation direction. In this case, the clearance angle of the fourth flank is preferably within the range of 50° to 65°.

In the drill according to the present aspect, DLC may be coated on the surface of at least the leading end portion of the drill main body. In this way, the drill can improve the rigidity of the leading end portion of the drill main body.

The drill according to the present aspect may be a drill for cutting an aluminum alloy. Since the aluminum alloy is a light soft material that is flexible, when the aluminum alloy is cut using the drill, small and short chips are easily generated. Since the drill can make the gash portion larger, the drill can inhibit clogging of the chips at the inner sides of the gash portion and the discharge flute. Thus, the drill can favorably cut the aluminum alloy.

BRIEF DESCRIPTION OF THE DRAWINGS

FIG. 6 is a table showing results of a Test 1.

DESCRIPTION OF EMBODIMENTS

Figure 1:
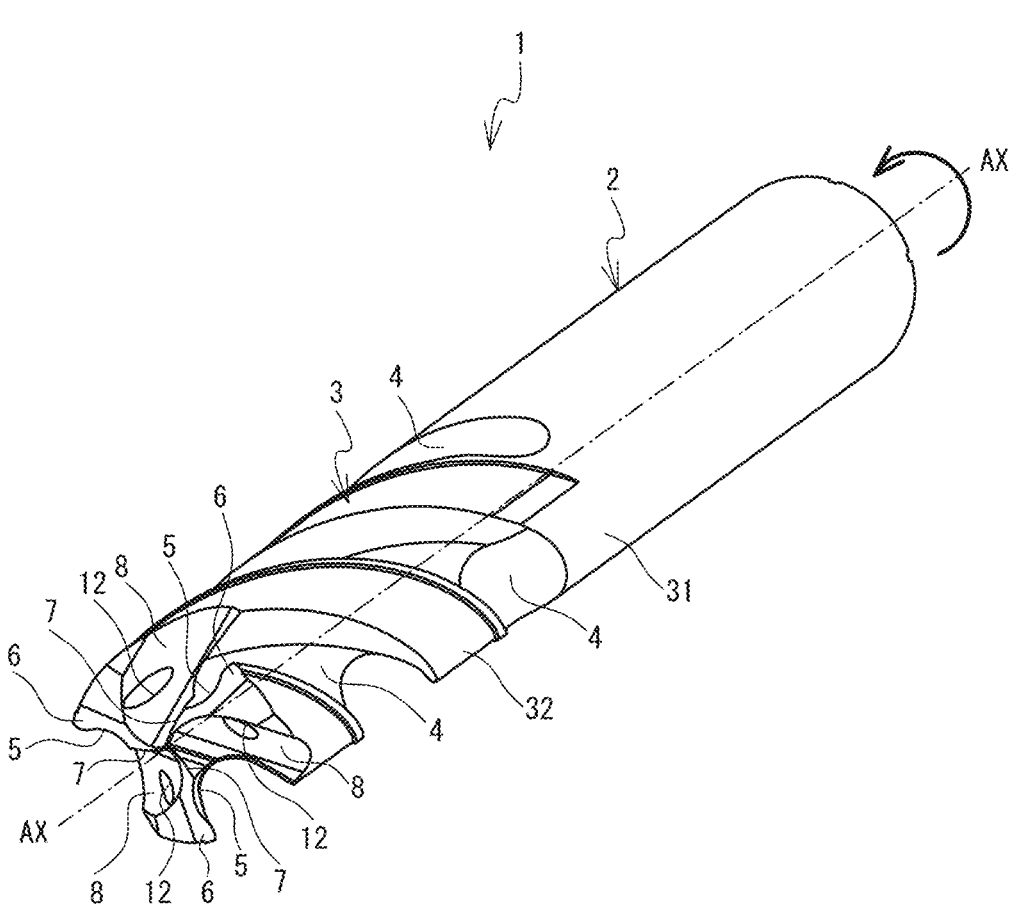
FIG. 1 is a perspective view of a drill 1.

An embodiment of the present invention will be described. The present invention is not limited to the following embodiment, and design changes can be made as appropriate. For descriptive clarity, there are locations in the drawings showing dimensional ratios that are different to actual dimensional ratios as necessary. The present invention is not interpreted as being limited to the shape thereof.

Figure 2:
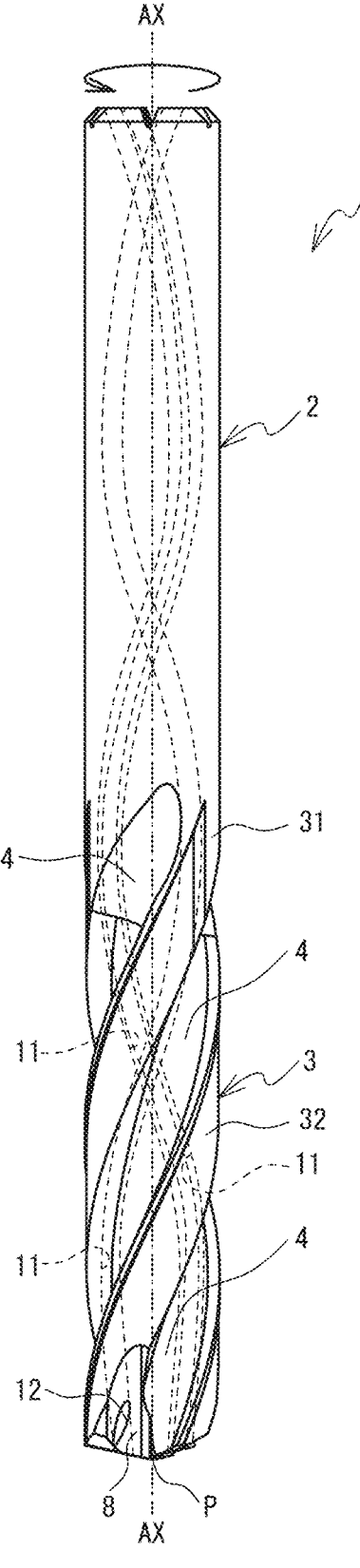
FIG. 2 is a side view of the drill 1.

The configuration of a drill 1 will be explained with reference to FIG. 1 to FIG. 3. As shown in FIG. 1 and FIG. 2, the drill 1 is a three-edged drill and is used for cutting an aluminum alloy, for example. The drill 1 is formed from a hard material, such as a cemented carbide, high speed tool steel (high speed steel), or the like. The drill 1 is provided with a shank 2 and a body 3. The shank 2 and the body 3 are an example of a "drill main body" of the present invention. The shank 2 is a portion that is mounted to a drive shaft of a machine tool, and is the rear end side of the drill 1. The body 3 extends along a shaft center AX from the front end of the shank 2. Three discharge flutes 4 are formed in a helical shape in an outer peripheral surface 31 of the body 3. The discharge flutes 4 discharge chips. Each of the discharge flutes 4 opens at the leading end portion of the body 3 and a cutting edge 5 is formed at the open portion. The drill 1 cuts a work material (not shown in the drawings) using the cutting edges 5, by rotating around the shaft center AX, and forms a machining hole while discharging the chips using the discharge flutes 4. At a time of machining, a rotation direction T of the drill 1 is a counterclockwise direction in a front view (refer to FIG. 3). The machine tool (not shown in the drawings) cuts the work material by rotating the drive shaft, to which the drill 1 is mounted, in the rightward direction.

Figure 3:
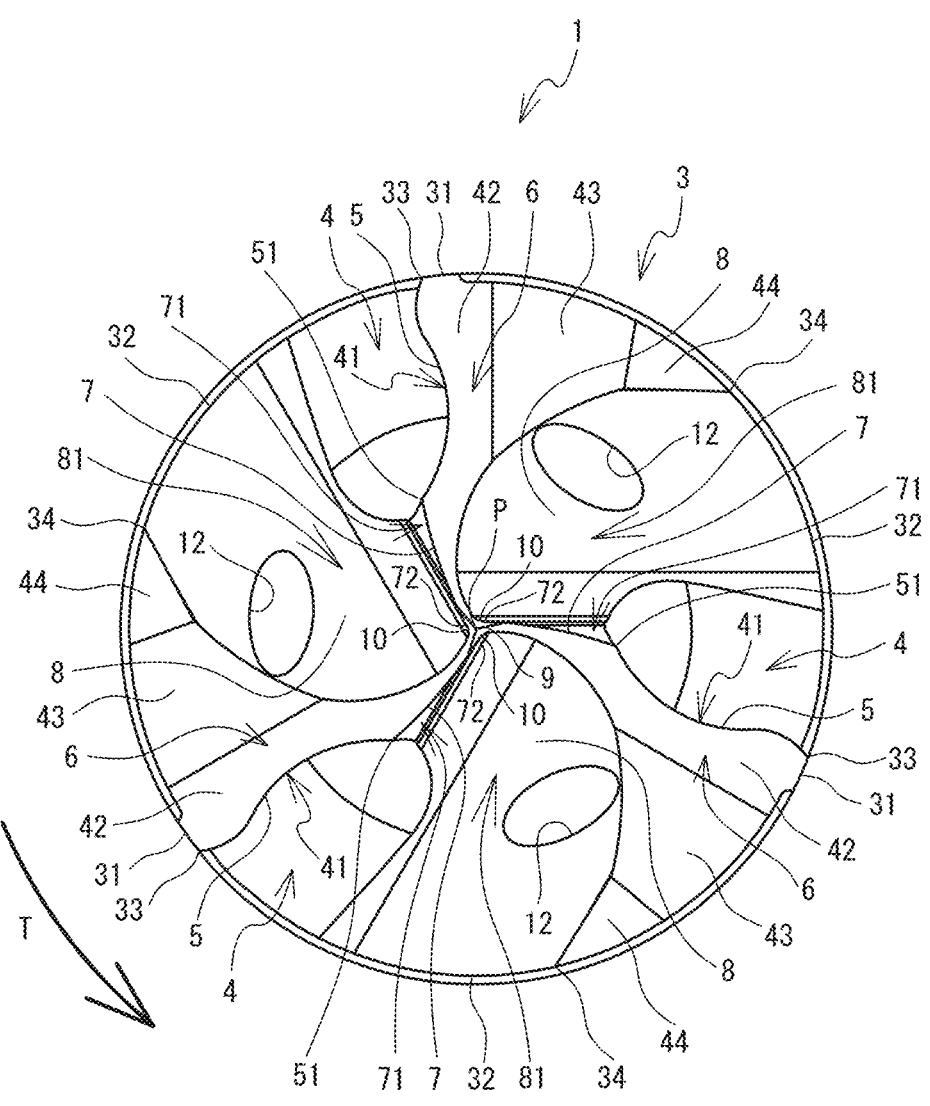
FIG. 3 is a front view of the drill 1.

As shown in FIG. 3, the discharge flute 4 is provided with an inner face 41. The cutting edge 5 is formed at a ridge section at which the inner surface 41 intersects a flank 6, at a section of the inner surface 41 oriented toward the rotation direction T side. The flank 6 is a surface avoiding contact with a processing surface of the work material. The cutting edge 5 is substantially S-shaped in a front view. Of the inner surface 41, the inner surface 41 on the cutting edge 5 side is a rake face, and scoops up the chips cut by the cutting edge 5 and causes the chips to flow to the discharge flute 4.

Of the inner surface 41, a section of the inner surface 41 on the cutting edge 5 side that intersects the outer peripheral surface 31 of the body 3 is a leading edge 33. A body clearance 32 is provided between the leading edges 33 that are adjacent to each other in a circumferential direction. The body clearance 32 has a smaller diameter than a drill diameter D. By including the body clearance 32, the drill 1 can reduce frictional resistance due to contact between an inner surface of a machining hole and the outer peripheral surface 31 of the body 3 when forming the machining hole, and can suppress heat generation and machining torque. Of the inner surface 41, a section at which the inner surface 41 on the opposite side from the cutting edge 5 intersects the body clearance 32 is a heel 34.

A chisel 9 is provided in the vicinity of a center portion P of the leading end portion of the drill 1. A thinning process is performed on the leading end portion of the drill 1. The thinning process is processing to thin the web thickness in the vicinity of the chisel 9. For example, the thinning process forms a thinning edge 7 by cutting into the open portion of the discharge flute 4 while rotating a grinding stone, from an inner end 51 of the cutting edge 5 to the side of the chisel 9. The inner end 51 of the cutting edge 5 is an end portion on the inner side on the shaft center AX side. The thinning edge 7 extends in a circular arc shape, in a front view, from the inner end 51 toward the chisel 9. As a result of forming the thinning edge 7, a thinning face 71 is formed at the leading end portion of the drill 1. The thinning face 71 is a rake face oriented toward the side of the rotation direction T of the thinning edge 7.

After forming the thinning edge 7, the thinning process further cuts in while relatively moving the grinding stone toward the heel 34 side, and forms a gash portion 8. The gash portion 8 is provided with a gash face 81. The gash face 81 is a curved surface recessed inward. A ridge line at which the gash face 81 and the flank 6 intersect each other extends in a circular arc shape from an inner end 72 of the thinning edge 7 toward the outer peripheral surface 31, and connects to the body clearance 32. The inner end 72 of the thinning edge 7 is an end portion on the inner side on the shaft center AX side. The gash portion is connected to the body clearance 32 of the body 3, and thus, can secure a larger capacity of a chip pocket. The chip pocket is a space accommodating the chips cut by the thinning edge 7. Thus, the drill 1 can smoothly dispatch the chips to the discharge flute 4 without causing clogging.

Figure 4:
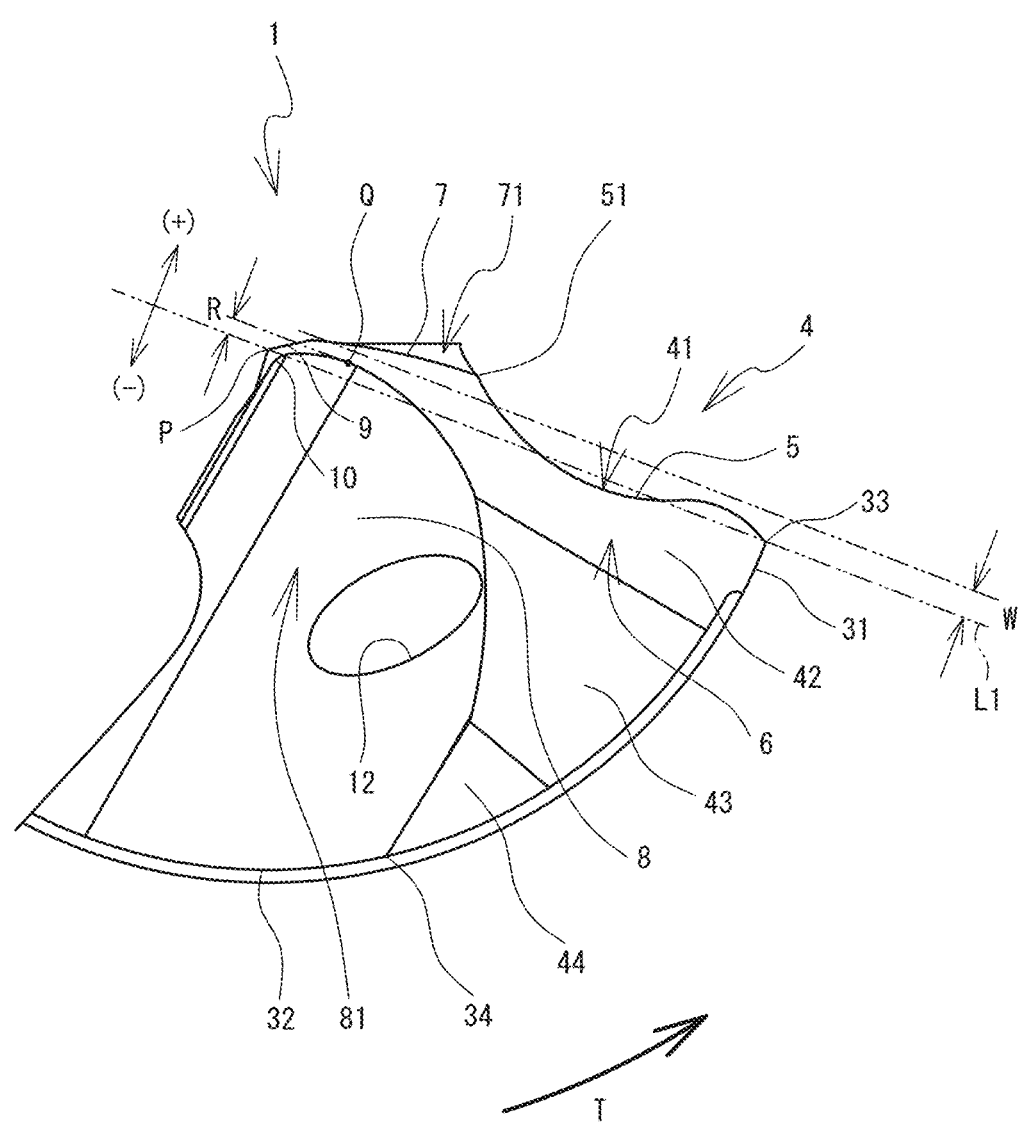
FIG. 4 is an enlarged partial view of a flank 6 and a gash portion 8 shown in FIG. 3.

As shown in FIG. 4, a vertex Q of the gash portion 8 is a peak portion bulging in a circular arc shape to the cutting edge 5 side. When the drill diameter of the drill 1 is D and a virtual straight line joining the central portion P of the leading end portion and the leading edge 33 of the cutting edge 5 is L1, the vertex Q is preferably at a position within a predetermined range W of 0.04 D to 0, on the cutting edge 5 side of a direction orthogonal to the virtual straight line L1. In this way, the drill 1 can secure an even larger capacity of the chip pocket of the gash portion 8, while securing a surface area of the flank 6.

At the time of machining, the chips are generated by the thinning edge 7 in the vicinity of the chisel 9 cutting into the work material. The chips are scooped up by the thinning face 71, and pushed into the gash portion 8. The chips are rounded and curled by the gash face 81, are cut by the leading edge 33, and are dispatched to the discharge flute 4.

A circular arc groove 10 is formed at a section connecting the gash face 81 and the thinning face 71. The circular arc groove 10 extends in a straight line from the vicinity of the chisel 9 toward the discharge flute 4, and a cross section thereof in the extending direction forms a circular arc shape. The circular arc groove 10 can smoothly push the chips cut by the thinning edge 7 and scooped up by the thinning face 71 to the gash portion 8. Thus, the drill 1 can reduce cutting resistance and obtain a stable chip shape.

The drill 1 includes three coolant passages 11. The three coolant passages 11 penetrate the inside of the drill 1 in a helical shape from the rear end of the shank 2 to the leading end of the body 3, along the discharge flutes 4. Each of the coolant passages 11 is open at the gash face 81 of the gash portion 8, and forms an oil hole 12. At the time of machining, a cutting oil is supplied inside the coolant passage 11, and is ejected from the oil hole 12 toward a machining position of the work material. In this way, the drill 1 reduces the cutting resistance and suppresses the heat generation and the machining torque. The chips flow through the discharge flutes 4 together with the cutting oil and are smoothly discharged. In the drill 1, the oil hole 12 is provided at the gash face 81 and not at the flank 6, and thus, even if the gash portion 8 is made larger, chipping of the flank 6 does not occur.

In the drill 1 provided with the above-described configuration, it is preferable that the surface of at least the leading end portion of the body 3 be coated with Diamond-Like Carbo (DLC). DLC is a generic name for a thin film made of a material/substance having, as its main component, carbon having carbon-carbon bonds of both diamond and graphite (black lead). In this way, the drill 1 can improve the rigidity of the leading end portion of the body 3.

The configuration of the flank 6 will be described with reference to FIG. 3 and FIG. 5. The flank 6 is provided with a second flank 42, a third flank 43, and a fourth flank 44, in order toward the opposite side from the rotation direction T. The second flank 42 is positioned furthest to the front in the rotation direction T, and extends from the chisel 9 to the outer peripheral surface 31. The third flank 43 is bent to the rear end side from a section extending to the body clearance 32 from a central portion, in the radial direction, of the ridge line on the opposite side from the cutting edge 5 of the second flank 45. The third flank 43 then extends to the opposite side from the rotation direction T, and becomes narrower the further toward the leading end side. The fourth flank 44 is bent to the rear end side from a ridge line of the third flank 43 on the opposite side to the second flank 42 side, extends in the opposite direction from the rotation direction T, and becomes narrower the further toward the leading end side. The leading end portion of the fourth flank 44 is the heel 34.

Figure 5:
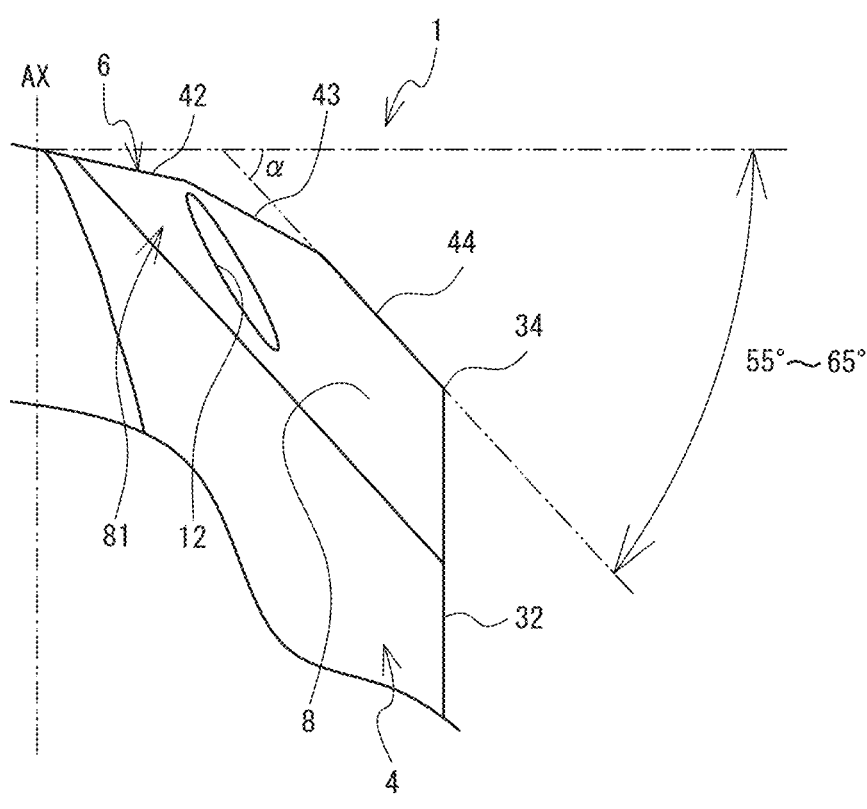
FIG. 5 is side view of the flank 6 as seen from a rotational direction T side.

As shown in FIG. 5, a clearance angle α of the fourth flank 44 is preferably within a range of 55° to 65°. The clearance angle is an angle of the flank with respect to a direction orthogonal to the shaft center AX. In this way, even if the gash portion 8 is made larger, the drill 1 can gently connect the gash portion 8 to the body clearance 32 without generating a sharp point at an outer end portion of the gash portion 8. As a result, the drill 1 can inhibit chipping from occurring on the outer end portion of the gash portion 8.

Next, a Test 1 was performed to evaluate the position of the vertex Q of the gash portion 8, and a numerical limit of the clearance angle α of the fourth flank 44. As shown in FIG. 4, in Test 1, a distance from the vertex Q to the virtual straight line L1 is R. The distance R is a distance between the virtual straight line L1 and the vertex Q. The side further to the side of the cutting edge 5 than the virtual straight line L1 is a + (plus) direction, and the opposite side thereto is a − (minus) direction. In Test 1, eight patterns were evaluated with respect to the distance R, where the drill diameter was D, namely, −0.005 D, 0, 0.005 D, 0.01 D, 0.02 D, 0.03 D, 0.04 D, and 0.05 D. Then, for the clearance angle α of the fourth flank 44, seven patterns were evaluated, namely, 30°, 40°, 50°, 60°, 65°, 70°, and 80°. In Test 1, 56 types of the three-edged drill 1 were targeted for evaluation, combining the eight patterns for the distance R and the seven patterns for the clearance angle α.

Two types were evaluated with the drill diameter D of φ12 mm and φ13 mm. Aluminum die-cast ADC12 was used as the work material. Machining depths of the work material were set to 90 mm for the φ12 mm drill and 100 mm for the φ13 mm drill. A cutting speed was 376 m/min. A feed amount was 1.0 mm/rev. Machining to drill holes in the work material was repeatedly performed under the above-described conditions, and the durability of the drills was judged using three evaluation levels of ○ (Good), Δ (Marginal), x (Poor).

In Test 1, drills that could machine a cutting length of 1400 mm, for which there was no damage or chipping, and for which an abrasion width of the flank was 0.2 mm or less were judged to be Good. Drills that were unable to machine a cutting length of 1400 mm, that had damage or chipping, or for which the abrasion width of the flank was in excess of 0.2 mm were judged to be Marginal. Drills that had damage or chipping in the early stage of machining were judged to be Poor.

The results of Test 1 will be described with reference to FIG. 6. When the distance R of the vertex Q was −0.005 D, the drills 1 having the clearance angles α of 50° to 70° were Marginal, and the drills 1 having the clearance angles α of 30°, 40°, and 80° were Poor. When the distance R of the vertex Q was 0, the drills 1 having the clearance angles α of 50° to 65° were Good, the drills 1 having the clearance angles α of 40°, and 70° were Marginal, and the drills 1 having the clearance angles α of 30°, and 80° were Poor. When the distance R of the vertex Q was 0.005, the drills 1 having the clearance angles α of 50° to 70° were Good, the drill 1 having the clearance angle α of 40° was Marginal, and the drills 1 having the clearance angles α of 30°, and 80° were Poor. When the distance R of the vertex Q was 0.01 D, the drills 1 having the clearance angles α of 40° to 70° were Good, and the drills 1 having the clearance angles α of 30°, and 80° were Poor.

When the distance R of the vertex Q was 0.02 D, the drills 1 having the clearance angles α of 40° to 65° were Good, the drill 1 having the clearance angle α of 70° was Marginal, and the drills 1 having the clearance angles α of 30°, and 80° were Poor. When the distance R of the vertex Q was 0.03 D, the drills 1 having the clearance angles α of 40° to 65° were Good, the drill 1 having the clearance angle α of 70° was Marginal, and the drills 1 having the clearance angles α of 30°, and 80° were Poor. When the distance R of the vertex Q was 0.04 D, the drills 1 having the clearance angles α of 40° to 65° were Good, and the drills 1 having the clearance angles α of 30°, 70°, and 80° were Poor. When the distance R of the vertex Q was 0.05 D, the drills 1 having the clearance angles α of 40° to 65° were Marginal, and the drills 1 having the clearance angles α of 30°, 70°, and 80° were Poor.

An optimal range of the distance R of the vertex Q is determined on the basis of the above-described results. With respect to the position of the vertex Q of the gash portion 8, the distances R of for which the judgment was Good were within the range of 0 to 0.04 D. Thus, it was demonstrated that the optimal range of the vertex Q from the virtual straight line L1 is 0 to 0.04 D. Next, in the range of the distance R of 0 to 0.04 D, the clearance angles α of the fourth flank 44 for which the judgement was Good were within the range of 50° to 65°. Thus, under the condition of the range of the distance R of 0 to 0.04 D, it was proved that the optimal range of the clearance angle α is 50° to 65°.

Next, Tests 2 and 3 were performed to evaluate the durability performance of the drill 1. Test 2 measured a maximum thrust resistance (N) when machining the work material using the drill 1, and evaluated the durability of the drill 1 by comparing the drill 1 to a known product. Thrust resistance refers to the cutting resistance acting in an opposite direction to a direction of movement of the drill 1. The cutting resistance is generated in a perpendicular direction with respect to the cutting edge 5 of the drill 1, and the receiving of that cutting resistance in the axial direction is the thrust resistance. Test 3 measured a maximum cutting torque (N) when machining the work material using the drill 1, and evaluated the durability performance of the drill 1 by comparing the drill 1 to a known product. The known product is a known gash drill in which the oil holes are provided in clearance portions. Drills having a drill diameter D of φ10 mm were evaluated. Aluminum die-cast ADC12 was used as the work material. The machining depth of the work material was set to 30 mm. The cutting speed was 314 m/min. The feed amount was 1.2 mm/rev.

Figure 7:
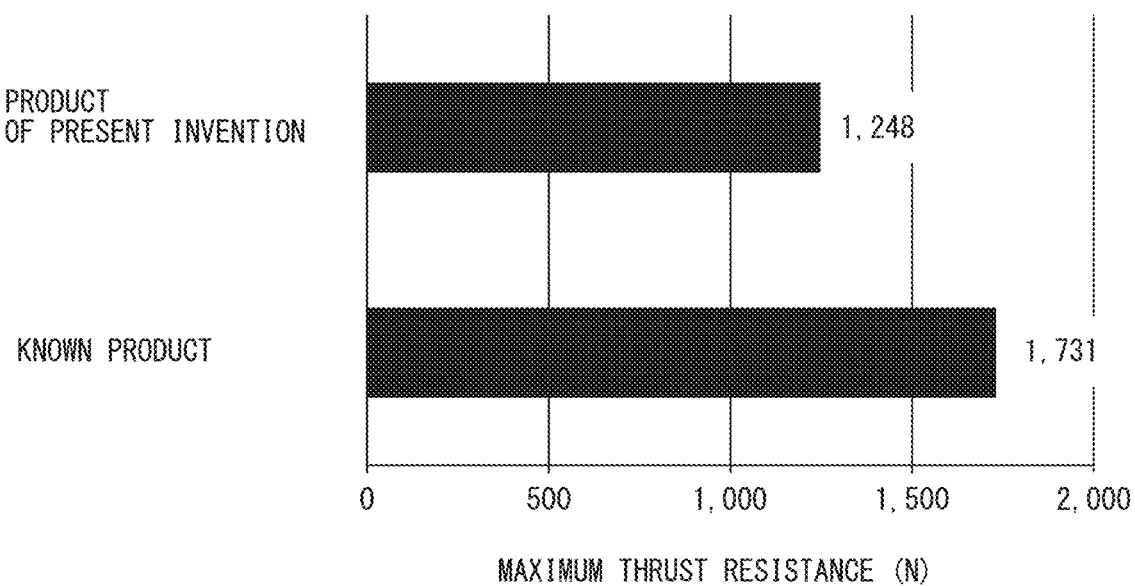
FIG. 7 is a graph showing results of a Test 2.
Figure 8:
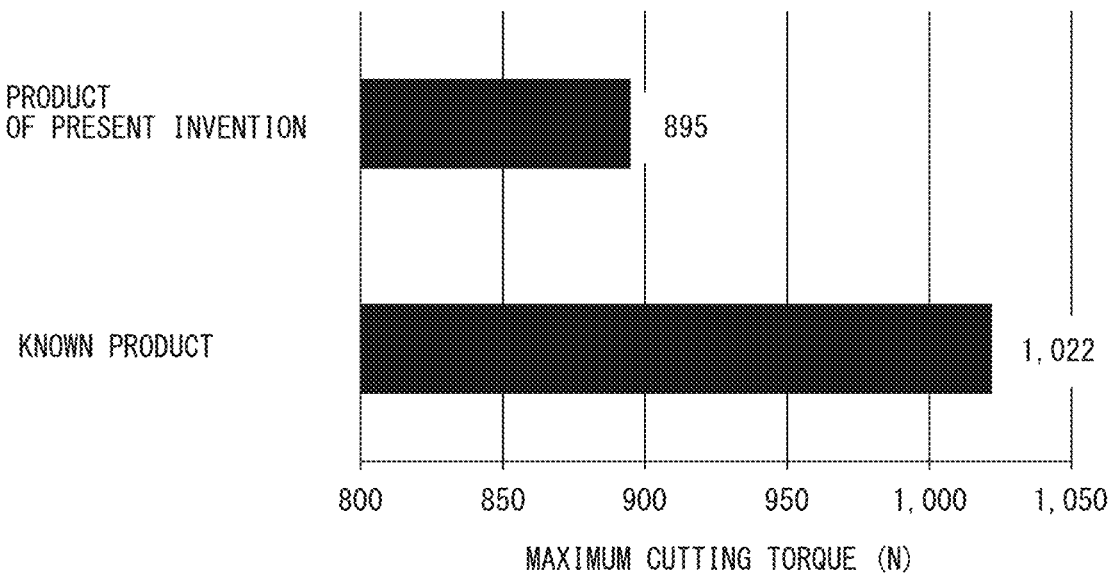
FIG. 8 is a graph showing results of a Test 3.

The results of Tests 2 and 3 will be described. The product of the present invention is the drill 1 of the present embodiment. As shown in FIG. 7, in Test 2, the maximum thrust resistance of the known product was 1,731 (N). In contrast to this, the maximum thrust resistance of the product of the present invention was 1,248 (N). According to these results, the product of the present invention was proved to be able to reduce the maximum thrust resistance operating during the machining, compared to the known product. As shown in FIG. 8, in Test 3, the maximum cutting torque of the known product was 1,022 (N). In contrast to this, the maximum cutting torque of the product of the present invention was 895 (N). According to these results, the product of the present invention was proved to be able to greatly reduce the maximum cutting torque operating during the machining, compared to the known product. Thus, the product of the present invention was proved to be able to effectively reduce the thrust resistance and the cutting torque operating during the machining. In this way, it was understood that the drill 1 can improve durability with respect to machining the work material.

As described above, the drill 1 of the present embodiment is provided with the shank 2, the body 3, the discharge flutes 4, and the cutting edges 5. The shank 2 and the body 3 are connected along the shaft center AX, and are rotated around the shaft center AX. The discharge flutes 4 are provided in the helical shape along the outer peripheral surface 31, from the leading end portion of the body 3 toward the rear end portion of the shank 2. The cutting edges 5 are formed at the ridge sections between the inner surfaces 41, of the discharge flutes 4, oriented toward the rotation direction T of the body 3, and the flanks 6. The drill 1 is further provided with the thinning edges 7, the gash portions 8, the coolant passages 11, and the oil holes 12. The thinning edges 7 are provided at the leading end portion of the body 3, and extend from the inner ends 51 of the cutting edges 5 toward the central portion P side. The ridge lines between the gash portions 8 and the flanks 6 extend in the circular arc shape from the inner ends of the thinning edges 7 toward the side of the outer peripheral surface 31 of the body 3. The coolant passages 11 are provided inside the shank 2 and the body 3, and extend from the rear end portion of the shank 2 toward the leading end portion of the body 3. The oil holes 12 are provided at the gash faces 81 of the gash portions 8, and are outlets of the coolant passages 11. The oil holes 12 are provided at the gash faces 81. In this way, even when the web thickness of the flanks 6 becomes thinner due to increasing the size of the gash portions 8, the drill 1 can secure the shape of the oil holes 12. Since the gash portions 8 of the drill 1 are made larger, even in the case of a work material such as an aluminum alloy, a chip discharge performance can be improved.

When the drill diameter is D, the vertex Q bulging in the circular arc shape to the side of the cutting edge 5 of the gash portion 8 is disposed within the predetermined range W of 0.04 D to 0, to the cutting edge 5 side with respect to the virtual straight line L1 joining the central portion P of the leading end portion with the leading edge 33 of the cutting edge 5. In this way, the drill 1 can maintain the durability while improving the chip discharge performance.

The gash portion 8 extends in the circular arc shape from the inner end of the thinning edge 7, and is connected to the body clearance 32 of the body 3. In this way, the drill 1 makes the gash portion 8 larger, and can secure a larger capacity of the chip pocket.

The flank 6 is provided with the second flank 42, the third flank 43, and the fourth flank 44, which are aligned in the opposite direction to the rotation direction T of the body 3 and for which the clearance angle becomes larger in order. The fourth flank 44 is positioned furthest to the rear in the rotation direction T. The clearance angle α of the fourth flank 44 is within the range of 50° to 65°. In this way, even when the gash portion 8 is made larger, the drill 1 can gently connect the gash portion 8 to the clearance portion 32 of the body 3, without generating the sharp point at the outer end portion of the gash portion 8. Thus, since the drill 1 can inhibit chipping from occurring on the outer end portion of the gash portion 8, the drill 1 can improve the durability.

The drill 1 is used for cutting a soft material, such as an aluminum alloy or the like. The aluminum alloy is a soft flexible material, and thus, when being cut by the drill 1, small short chips are easily generated. The drill 1 makes the gash portion 8 larger, and thus, the drill 1 can inhibit chip clogging in the gash portion 8 and the inside of the discharge flute 4. As a result, the drill 1 can favorably cut the aluminum alloy.

Note that the present invention is not limited to the above-described embodiment, and various changes are possible. The drill 1 is the three-edged drill, but may be a two-edged drill. The number of the cutting edges 5 is not limited. The coolant passages 11 are the helical shape, but need not necessarily be the helical shape, and may be a straight line shape, for example. The three circular arc grooves 10 are provided at the leading end portion of the body 3, but the circular arc grooves 10 may be omitted. The flank 6 is provided with the second flank 42, the third flank 43, and the fourth flank 44, but the number of flanks may be more or less than this number. The single oil hole 12 is provided in the single gash portion 8, but two or more of the oil holes 12 may be provided in the single gash portion 8. The shape of the oil hole 12 need not necessarily be circular, and may be elliptical or polygonal, for example. The drill 1 may be a long drill. The drill 1 is a drill for machining the soft work material, such as the aluminum alloy, but may be used for machining a hard work material. The material of the drill 1 is not limited. The gash portion 8 may be formed by a method other than the thinning process. The body clearances 32 formed in the outer peripheral surface 31 of the body 3 may be omitted. The ridge line between the gash portion 8 and the flank 6 is connected to the clearance portion 32 of the body 3, but may be connected to the discharge flute 4 further to the inside, in the radial direction, than the body clearance 32. The Diamond-Like Carbo (DLC) is coated on the surface of at least the leading end portion of the body 3, but may also be coated on the outer peripheral surface 31. The DLC need not necessarily be coated on the body 3. The thinning edges 7 need not necessarily be formed. The gash portion 8 is the circular arc shape, but may be a straight line shape.

The invention claimed is:

1. A drill including a drill main body to be rotated around a shaft center, and a discharge flute provided in a helical shape along an outer peripheral surface of the drill main body from a leading end portion toward a rear end portion thereof, a cutting edge being provided that is formed at a ridge section between an inner face, of the discharge flute, oriented toward a rotation direction side of the drill main body and a flank of the drill main body at the leading end portion, the drill comprising:

a thinning edge provided at the leading end portion of the drill main body and extending from an inner end of the cutting edge toward a central portion side of the leading end portion of the drill main body;

a gash portion, a ridge line between the gash portion and the flank extending in a circular arc shape from an inner end of the thinning edge toward the outer peripheral surface of the drill main body;

a coolant passage provided inside the drill main body and extending from the rear end portion toward the leading end portion of the drill main body; and an oil hole provided only at a gash face of the gash portion, the oil hole being an outlet of the coolant passage.

2. The drill according to claim 1, wherein when a drill diameter of the drill is D, at the leading end portion of the drill main body, a vertex of the gash portion bulging in a circular arc shape to the side of the cutting edge is disposed within a range of 0.04D to 0, to the cutting edge side with respect to a virtual straight line joining a center of the leading end portion and an outer end of the cutting edge.

3. The drill according to claim 1, wherein the gash portion extends in the circular arc shape from the inner end of the thinning edge and is connected to the outer peripheral surface of the drill main body.

4. The drill according to claim 3, wherein the flank is provided with a plurality of flanks aligned in an opposite direction to the rotation direction, a clearance angle of the flanks becoming larger in order of the flanks, and of the plurality of flanks, the clearance angle of a rear-side flank positioned furthest to the rear in the rotation direction is within a range of 50° to 65°.

5. The drill according to claim 1, wherein

DLC is coated on the surface of at least the leading end portion of the drill main body.

6. The drill according to claim 1, wherein the drill is a drill for cutting an aluminum alloy.

* * * * *